GEORGE NOTMAN.
Improvement in Horse Hay-Rakes.
No. 114,591. Patented May 9, 1871.
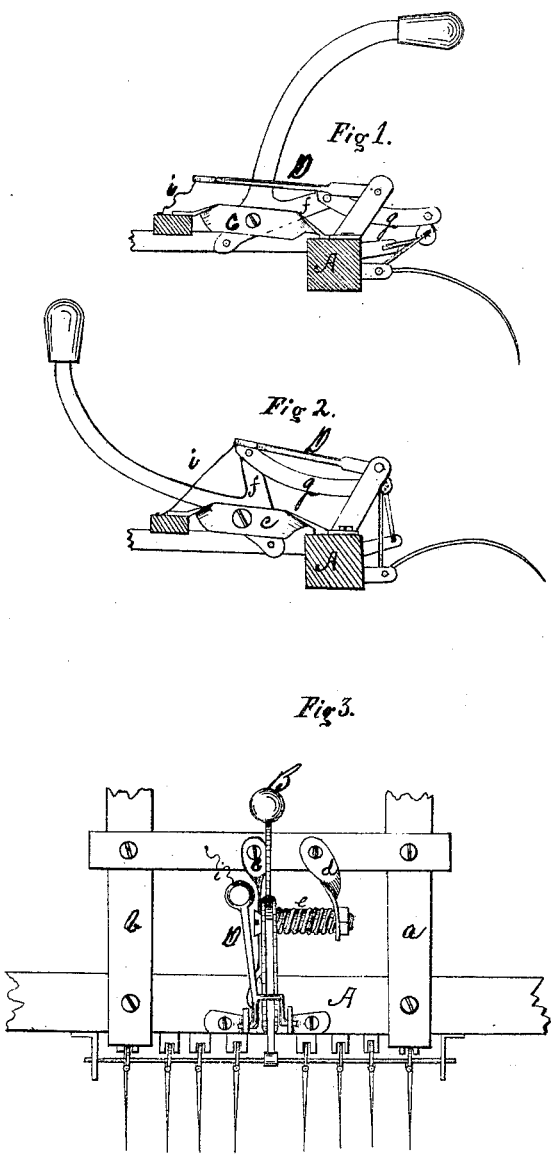

United States Patent Office.

GEORGE NOTMAN, OF DEERFIELD, OHIO.

Letters Patent No. 114,591, dated May 9, 1871.

IMPROVEMENT IN HORSE HAY-RAKES.

The Schedule referred to in these Letters Patent and making part of the same.

*To all whom it may concern:*

Be it known that I, GEORGE NOTMAN, of Deerfield, county of Portage and State of Ohio, have invented a new and useful Improvement in Horse Hay-Rakes; and I do hereby declare that the following is a full and exact description thereof sufficient to enable others skilled in the art to make and use the same, reference being had to the accompanying drawing making part of this specification, in which—

Figure 1 is a side elevation, showing the levers depressed, and also the rake-teeth lifting-bar.

Figure 2 is also a side elevation, with the devices raised, the view being taken from the opposite side.

Figure 3 is a top plan view.

My invention relates to an improvement designed especially to be attached to the rake for which I received Letters Patent dated May 3, 1870, No. 102,578; and It consists of a compound leverage for raising and lowering the rake-teeth, as is specifically set forth in the following:

Referring to the drawing and the letters of reference marked thereon, like letters in the several figures indicating like parts—

A may represent the axle of the rake, to which the rake-teeth are secured in the manner described in my patent above mentioned, and $a\ b$ are parts of the frame of the machine.

Two, more or less, cross-pieces, $c\ d$, are secured to this frame, and on a bolt passing between them a lever, B, is fixed.

A coiled spring, $e$, passes around this bolt and is connected to the lever B, thus rendering its movements elastic, and is properly arranged so as to keep the teeth elevated, so as to remove their otherwise great liability of being broken.

This lever is made with a long arm, to which a suitable operating handle is attached, and a short arm, $f$. The two are made in one piece and, extending downward, are flattened, so as to receive a number of holes, by means of which the lever can be adjusted high or low on the bolt. The handle also extends upwardly to within an easy-reaching distance of the driver.

A slotted or forked-end arm or rod, $g$, is secured by one end to the short arm $f$ of the lever B, and extends thence to a small link on the teeth-lifting bar C, to which it is secured in a similar manner.

This bar C, as in my former patent, is placed underneath the short arms of the rake-teeth, and as the lever B is pressed down of course the teeth are elevated so as to pass over any obstacle, or when not used, and when raised, the teeth are in position for being used.

The teeth may be held at any desired elevation by means of a foot-lever, D, hung in bearings on the axle, which lever is forked at one end and rides over the arm $g$; and if it be pressed down, as in fig. 1, the teeth are held down, and the teeth may be raised to any height. The foot-lever, being pressed down, will hold them there.

The lever is prevented from flying back, when the operator's foot is removed, by means of a cord or chain, $i$, of sufficient length, secured to the frame and the lever.

As will be readily seen, the devices in operation are as effective as simple, and the operation of raising and lowering the teeth is so quickly performed that obstacles can be avoided at the shortest notice.

This device can be applied to most any rake, and is specially adapted to those having teeth made similar to those shown in my former patent.

Having thus described my invention,

What I claim as new, and desire to secure by Letters Patent, is—

1. The lever B combined, as described, with the spring $e$, arm $g$, and teeth-lifting bar C, substantially as and for the purpose set forth.

2. The foot-lever D, in combination with the lever B, rod $g$, bar C, and spring $e$, all arranged and operating substantially in the manner and for the purpose herein specified.

To the above specification I have signed my name this 10th day of February, A. D. 1871.

GEORGE NOTMAN.

Witnesses:
JOHN H. HOFFMAN,
W. S. HOFFMAN.